Aug. 25, 1964    SUNAO YAMASHITA    3,145,727
AUTOMATIC LIQUID LEVEL CONTROL DEVICE
Filed Aug. 14, 1963    2 Sheets-Sheet 1
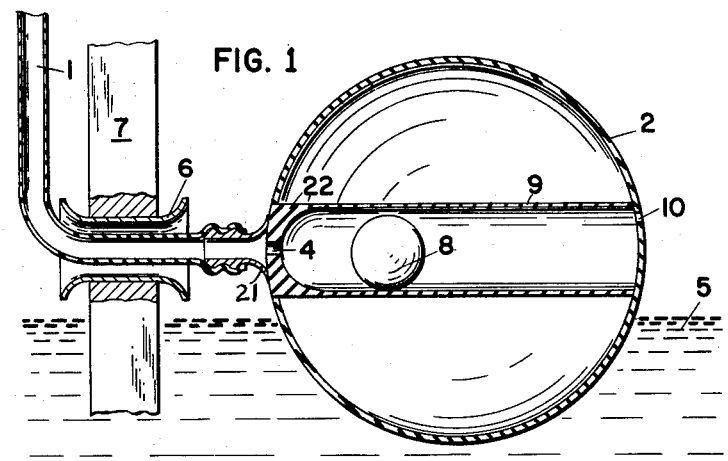
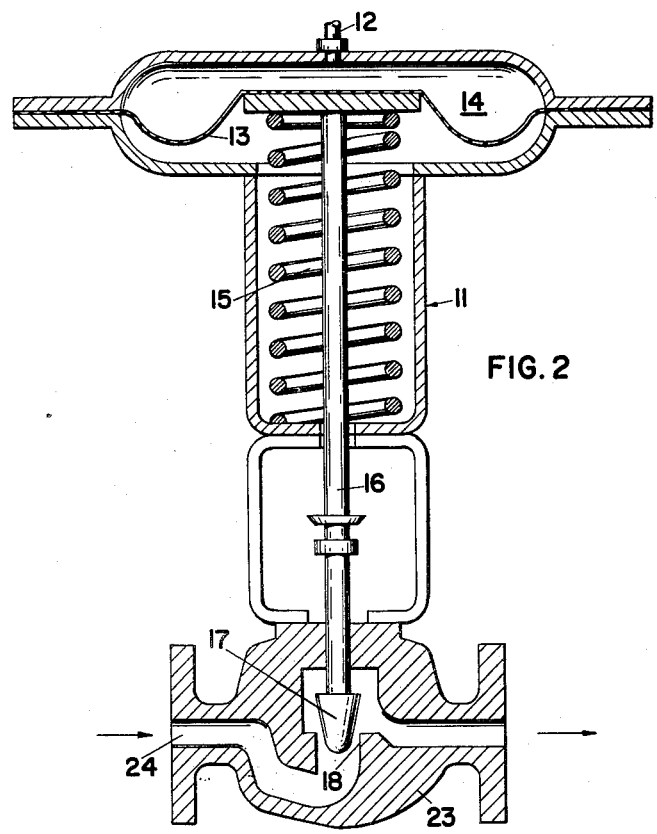
INVENTOR.
SUNAO YAMASHITA
BY
AGENT Aug. 25, 1964  SUNAO YAMASHITA  3,145,727
AUTOMATIC LIQUID LEVEL CONTROL DEVICE
Filed Aug. 14, 1963  2 Sheets-Sheet 2
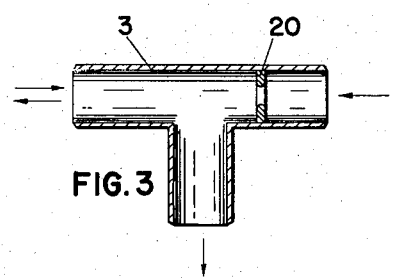
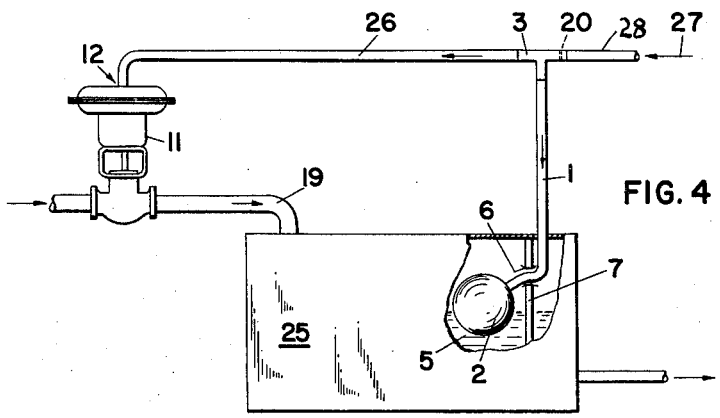
INVENTOR.
SUNAO YAMASHITA
BY
*Kurt Kelman*
AGENT

United States Patent Office 3,145,727
Patented Aug. 25, 1964

3,145,727
AUTOMATIC LIQUID LEVEL CONTROL DEVICE
Sunao Yamashita, Tokyo, Japan, assignor to
Ajinomoto Co., Inc., Tokyo, Japan
Filed Aug. 14, 1963, Ser. No. 302,032
Claims priority, application Japan Aug. 17, 1962
8 Claims. (Cl. 137—413)

This invention relates to liquid level control devices, and more particularly to a level control device in which a float is being employed as a liquid level sensing element.

It is known to control the liquid supply to a container by means of a valve equipped with an electrical actuator controlled by a float switch, or equipped with a pneumatic actuator controlled by a float valve. Float switches are difficult to protect against corrosion where the level of acids and similar liquids is to be controlled, and float valves require rather complex and costly seals for service in corrosive environments.

The object of the invention is the provision of an automatic arrangement for controlling the level of a liquid which may be employed in a corrosive environment, yet is simple and sturdy so as to be capable of operating over long periods of time without maintenance.

Another object is the provision of a level control arrangement which is readily adapted to operation at elevated temperature and at any practical pressure.

With these and other objects in view, the invention in one of its aspects resides in a float assembly in which a float member is provided with pivot means permitting the float member to be mounted in a contatiner for pivotal movement in a vertically extending plane. An outlet valve member is mounted on the float member. A valve blocking member is movable on the outlet valve member responsive to the aforementioned pivotal movement of the float member toward and away from a blocking position in which it obstructs the outlet valve member. A pressure fluid conduit connects the outlet valve member to a pressure fluid operated valve actuator.

Other features and many of the attendant advantages of this invention will become apparent from the following detailed description of a preferred embodiment when considered in connection with the attached drawing in which:

FIG. 1 shows a spherical float member of the invention and associated elements of a liquid level control arrangement in elevational section through the center of the float member;

FIG. 2 illustrates a conventional control valve equipped with a diaphragm type actuator, and adapted to cooperate with the float member of FIG. 1, the view being in elevational section;

FIG. 3 is an elevationally sectional view of a T fitting for connecting the float member of FIG. 1 with the valve of FIG. 2; and FIG. 4 illustrates a tank equipped with the automatic level control arrangement of the invention in an elevational, partly sectional view.

Referring now to the drawing in detail, and initially to FIG. 1, there is seen a flexible tube 1 engaging a nipple 21 of a hollow spherical float member 2. A generally cylindrical tube 9 integrally joined to the float member 2 has a longitudinal axis which coincides with a diameter of the float member aligned with the nipple 21 so that portions of the float member constitute axial end walls of the tube 9. The tube 1, float member 2, and tube 9 may consist of rubber, polyvinyl chloride, or other suitable material resistant to the liquid 5 the level of which is to be controlled, and on which the float member 2 is buoyantly supported.

A ball 8 of stainless steel or smoothly finished ceramic material has a cross section smaller than that of the tube 9. It is mounted in the tube and free to roll axially therein. The axial end wall 22 of the tube 9 adjacent the nipple 21 is reinforced and has an axial passage 4 communicating with the nipple 21. The passage 4 serves as an outlet for the tube 1.

The portion of the wall 22 around the passage 4 is concavely curved and has a radius of curvature closely similar to or identical with the radius of the heavy ball 8. When the ball moves into contact with the wall 22, the passage 4 is obstructed, and practically blocked.

The other end wall of the tube 9 has a radius of curvature equal to the internal radius of the float member 2, and very much greater than the radius of the ball 8. When the ball abuts against this end wall, it makes point contact with a central portion of the end wall. The wall has a vent opening 10 which is upwardly spaced from that central portion, and thus permanently open regardless of the position of the ball 8.

The terminal portion of the tube 1 adjacent the nipple 21 passes through a short length of pipe 6 which is flared at both ends and is mounted on a supporting rod 7. The flexibility of the tube 1 permits the float member 2 to pivot about a horizontal axis located approximately at the pipe 6 as the level of the liquid 5 rises and falls. A relatively great clearance between the tube 1 and the pipe 6 has been shown in the drawing for the sake of clarity. The dimensions of the tube 1 and of the pipe 6 may be chosen to provide very little cross sectional clearance without affecting the operation of the apparatus.

When the level of the liquid 5 rises, the axis of the tube 9 is tilted from the horizontal position shown in FIG. 1 to an inclined position in which it slants upward from the end wall 22. The ball 8 rolls into its valve blocking position. When the liquid level drops, the axis of the tube 9 slants downward from the end wall 22, and the ball 8 rolls toward the vent opening 10 without however blocking the same.

The movements of the ball 8 in the tube 9 under the influence of gravity during the pivotal movement of the float member 2 are employed for actuating a valve 11 shown in FIG. 2. The valve has a body 23 formed with a passage 24 therethrough. A valve seat 18 at a central portion of the passage 24 may be gradually opened and closed by a conical valve member 17 arranged on a stem 16.

The actuating mechanism of the valve 11 includes a pressure chamber 14 one wall of which is formed by a flexible diaphragm 13. The chamber has an inlet 12 for compressed air which tends to push the diaphragm 13 outward of the chamber 14 against the force of a return spring 15. The valve stem 16 is attached to the diaphragm 13 and moves with it toward and away from the valve seat 18, thereby varying the effective flow section of the passage 24 between the valve member 17 and the seat 18.

The float assembly illustrated in FIG. 1 and the valve shown in FIG. 2 are connected to each other and to a source of compressed air by a T fitting 3 illustrated in FIG. 3. A fixed-orifice throttle disk 20 is arranged in that branch of the T fitting which is connected to the compressed air supply, thereby limiting the rate of air supply to a value which can be chosen by selection of the aperture size of the disk 20.

The cooperation of the float assembly with the valve 11 for control of liquid level in a container is illustrated in FIG. 4. The wall of an open tank 25 is shown partly broken away to reveal the pivotal mounting of the float member 2 in the tank on the supporting rod 7 by means of the pipe 6. The flexible tube 1 connects the outlet arrangement in the float member 2 with one of the branches of the T fitting 3. Another conduit 26 connects the air inlet 12 of the valve actuator with another branch of the T fitting 3, and the third branch of the fitting communicates with a source of compressed air indicated by the arrow 27 through a supply conduit 28.

The valve 11 is arranged in a liquid supply conduit 19 and controls the supply of liquid to the tank 25. The valve 11 is opened and closed by the movements of the float member 2 as follows:

As shown in FIG. 4, the level of the liquid 5 in the tank 25 is lower than the desired level. The position of the float member 2 is such that the tube 9 tilts downward from the pivot at the pipe 6, and air can freely escape through the passage 4 and the vent opening 10. Because of the throttling effect of the disk 20 on the air supply, the air is released through the vent opening 10 at the same rate at which it is supplied, and the pressure in the tube 1, the conduit 26, and the pressure chamber 14 of the valve actuator is only slightly higher than ambient atmosspheric pressure. The return spring 15 is capable of pushing the diaphragm 13 inward of the chamber 14, thereby lifting the valve member 17 from the seat 18, and opening the passage 24 for flow of liquid into the tank 25.

As the liquid level is the tank rises, there is eventually reached a position of the float member 2 in which the axis of the tube 9 is tilted upward from the pivot, and the ball 8 rolls toward the end wall 22 and obstructs or blocks the passage 4. The pressure in the tube 1, the conduit 26, and the pressure chamber 14 approaches or reaches the pressure of the compressed air at its source, the diaphragm 13 is pushed outward from the chamber 14 until the valve member 17 closes the passage 24, and further supply of liquid to the tank 25 is stopped.

It will be appreciated that the transition between the two oppositely inclined positions of the axis of tube 9 is a gradual one, and that the closing and opening action of the conical valve member 17 is similarly gradual.

If it is desired to close the tank 25 to the atmosphere and to maintain therein an atmosphere different from air, or at a controlled pressure different from atmospheric pressure, the vent opening 10 has to be provided with an additional flexible tube for leading the vented compressed air out of the tank. Although pneumatic operation of the valve 11 will usually be preferred, the invention is not limited to any specific operating fluid, nor to direct operation of a valve actuator by the compressed air released or retained by the outlet arrangement in the float member 2 in response to the liquid level in the tank 25. The compressed air or other pressure fluid may be employed in a conventional manner to actuate a relay or transducer, pneumatic, electrical, or other, which in turn may control the admission of liquid to the tank 25 by any desired valve means.

It should be understood, therefore, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. An arrangement for controlling the level of a liquid comprising, in combination:
    (a) a container for holding the liquid to be controlled;
    (b) a float member;
    (c) pivot means interposed between said float member and said container, said pivot means fastening said float member in said container for pivotal movement in a vertically extending plane;
    (d) outlet means mounted on said float member;
    (e) an outlet blocking member movable on said float member responsive to said pivotal movement of said float member toward and away from a blocking position in which said blocking member obstructs said outlet means;
    (f) a liquid supply conduit communicating with said tank;
    (g) control valve means in said conduit;
    (h) fluid pressure operated valve actuating means operatively connected to said control valve means;
    (i) a pressure fluid conduit connecting said actuating means and said outlet means; and
    (j) supply means communicating with said pressure fluid conduit for supplying pressure fluid to said conduit at a predetermined rate.

2. An arrangement as set forth in claim 1, wherein said outlet means includes a tubular member having an axis and an axial end portion and communicating with said pressure fluid conduit, said end portion being formed with an opening therein, said tubular member being mounted on said float member for movement of said axis between two positions angularly spaced in opposite directions from a horizontal position during said pivotal movement of said float member, said blocking member being movable in said tubular member under the force of gravity toward and away from a position in which said blocking member obstructs said opening.

3. An arrangement as set forth in claim 2, wherein said blocking member is of circular cross section and free to roll in said tubular member.

4. An arrangement as set forth in claim 2, wherein said blocking member is spherical.

5. An arrangement as set forth in claim 1, wherein said supply means include throttling means for limiting the supply of said pressure fluid to a rate not greater than the rate of flow of the supplied pressure fluid through said outlet means when said blocking member does not block said outlet means.

6. A float assembly comprising, in combination:
    (a) a float member;
    (b) pivot means for mounting said float member in a container for pivotal movement in a vertically extending plane;
    (c) outlet means mounted on said float member;
    (d) a valve blocking member movable on said float member responsive to said pivotal movement of said float member toward and away from a blocking position in which said blocking member obstructs said outlet means; and
    (e) a pressure fluid conduit for connecting said outlet means to a pressure fluid operated valve actuator.

7. An assembly as set forth in claim 6, wherein said outlet means includes a tubular member having an axis and an axial end portion and communicating with said pressure fluid conduit, said end portion being formed with an opening therein, said tubular member being mounted on said float member for movement of said axis thereof between two positions angularly spaced in opposite directions from a horizontal position during said pivotal movement of said float member, said blocking member being axially movable in said tubular member under the force of gravity toward and away from a position in which said blocking member obstructs said opening.

8. An assembly as set forth in claim 7, wherein said blocking member is spherical.

References Cited in the file of this patent

UNITED STATES PATENTS

| | | |
|---|---|---|
| 1,354,311 | Landrum | Sept. 28, 1920 |
| 2,171,394 | Christian | Aug. 29, 1939 |